(12) United States Patent
Ma et al.

(10) Patent No.: US 9,674,012 B2
(45) Date of Patent: Jun. 6, 2017

(54) DECISION FEEDBACK EQUALIZER AND CONTROL METHOD THEREOF

(71) Applicant: MStar Semiconductor, Inc., Hsinchu Hsien (TW)

(72) Inventors: Ching-Wen Ma, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/017,976

(22) Filed: Feb. 8, 2016

(65) Prior Publication Data
US 2017/0104614 A1    Apr. 13, 2017

(30) Foreign Application Priority Data
Oct. 7, 2015 (TW) .............................. 104133017 A

(51) Int. Cl.
*H04L 25/03* (2006.01)

(52) U.S. Cl.
CPC .. *H04L 25/03267* (2013.01); *H04L 25/03292* (2013.01)

(58) Field of Classification Search
USPC ................................. 375/233, 232, 229, 340
See application file for complete search history.

(56) References Cited

U.S. PATENT DOCUMENTS

| 7,382,827 B2* | 6/2008 | Yousef | H04L 1/06 375/229 |
| 2013/0170539 A1* | 7/2013 | Huang | H04L 25/0204 375/232 |
| 2014/0050260 A1* | 2/2014 | Cyrusian | H03F 3/45201 375/233 |
| 2014/0328380 A1* | 11/2014 | Pustovalov | H04L 25/03885 375/232 |

* cited by examiner

*Primary Examiner* — Eva Puente
(74) *Attorney, Agent, or Firm* — Edell, Shapiro & Finnan, LLC

(57) ABSTRACT

A control method for a decision feedback equalizer (DFE) includes: generating a channel impulse response (CIR) estimation vector according to an input signal at a CIR estimation frequency; generating an FFE coefficient according to the CIR estimation vector at a first frequency; generating an FBE coefficient according to the CIR estimation vector, and the FFE coefficient at a second frequency; generating a feed-forward equalization filtered result according to the input signal and the FFE coefficient; generating a feed-backward equalization filtered result according to a decision signal and the FBE coefficient; and generating an updated decision signal according to the feed-forward equalization filtered result and the feed-backward equalization filtered result. At least one of the first frequency and the second frequency is smaller than the CIR estimation frequency.

13 Claims, 14 Drawing Sheets

DECISION FEEDBACK EQUALIZER AND CONTROL METHOD THEREOF

This application claims the benefit of Taiwan application Serial No. 104133017, filed Oct. 7, 2015, the subject matter of which is incorporated herein by reference.

BACKGROUND OF THE INVENTION

Field of the Invention

The invention relates in general to a decision feedback equalizer, and more particularly, to a decision feedback equalizer capable of enhancing the computation performance and a control method thereof.

Description of the Related Art

FIG. 1 shows a functional block of a conventional decision feedback equalizer (DFE). A transmitted signal x(n) passes through a channel 10 and is affected by noise r(n) to become an input signal y(n) of a DFE 100, where n represents a time index. The DFE 100 includes a feed-forward equalizer (FFE) 110, a decider 120, a feed-backward equalizer (FBE) 130, a channel estimator 140, an FFE coefficient calculating unit 150, and an FBE coefficient calculating unit 160. One main function of the FFE 110 is processing pre-cursor inter-symbol interference signals and a part of post-cursor inter-symbol interference signals in the input signal y(n). One main function of the FBE 130 is processing post-cursor inter-symbol interference signals in the input signal y(n). The decider 120 then generates a decision signal x'(n) according to filtering results of the FFE 110 and the FBE 130.

An FFE coefficient the FFE 110 needs for operations and an FBE coefficient b the FBE 130 needs for operations are respectively generated by the FFE coefficient calculating unit 150 and the FBE coefficient calculating unit 160. The FFE coefficient calculating unit 150 generates the FFE coefficient f according to a channel impulse response (CIR) estimation vector h generated from the input signal y(n). The FBE coefficient calculating unit 160 generates the FBE coefficient b according to the CIR estimation vector h and the FFE coefficient f.

A minimum mean square error (MMSE) equalizer is a common type of a decision feedback equalizer (DFE), and features an advantage of leaving noise r(n) unamplified. Fast transversal recursive least squares (FT-RLS) are one most common algorithm for calculating the FFE coefficient f and the FBE coefficient b, and feature an advantage of having a fast convergence speed. An optimum FFE coefficient f and an optimum FBE coefficient b of an MMSE-DFE may be represented as follows:

$$f=((\Phi_{hh}-HH^H)+\sigma_n^2 I)^{-1}h \quad (1)$$

$$b=H^H \times f \quad (2)$$

In the above equations, the CIR estimation vector h=[h(Δ)h(Δ−1) ... h(Δ−$L_F$+1)], where Δ represents a decision delay, $L_F$ is the length of the FFE 110, the FFE 110 is an ($L_F$−1)-order equalizer and $L_F$ is a positive integer, $\Phi_{hh}$ represents a channel autocorrelation matrix, $\sigma_n^2$ represents noise energy, I represents a unit matrix, and the CIR estimation matrix h may be represented as:

$$H = \begin{bmatrix} h(\Delta+1) & \ldots & h(\Delta+L_B-1) \\ h(\Delta) & \ldots & h(\Delta+L_B-2) \\ \vdots & \ddots & \vdots \\ h(\Delta-L_F+2) & \ldots & h(\Delta+L_B-L_F) \end{bmatrix} \quad (3)$$

Wherein, $L_B$ is the length of the FBE 130, the FBE 130 is an ($L_B$−1)-order equalizer, and $L_B$ is similarly a positive integer.

It is known from equations (1) and (2) that, the computation complexity of the FFE coefficient f is far greater than that of the FBE coefficient b. Therefore, it is an important task of the technical field to provide a more efficient computation method for enhancing the performance of the DFE.

SUMMARY OF THE INVENTION

It is an object of the present invention to provide a decision feedback equalizer (DFE) and a control method thereof to enhance the computation performance of the DFE.

The present invention discloses a DFE. The DFE includes: a channel estimator, generating a channel impulse response (CIR) estimation vector according to an input signal at a CIR estimation frequency; a feed-forward equalizer (FFE) coefficient calculating unit, coupled to the channel estimator, generating an FFE coefficient according to the CIR estimation vector at a first frequency; a feed-backward equalizer (FBE) coefficient calculating unit, coupled to the channel estimator and the FFE coefficient calculating unit, generating an FBE coefficient according to the CIR estimation vector, and the FFE coefficient at a second frequency; an FFE, coupled to the FFE coefficient calculating unit generating a feed-forward equalization filtered result according to the input signal and the FFE coefficient; an FBE, coupled to the FBE coefficient calculating unit, generating a feed-backward equalization filtered result according to a decision signal and the FBE coefficient; and a decider, coupled to the FFE and the FBE, generating an updated decision signal according to the feed-forward equalization filtered result and the feed-backward equalization filtered result. At least one of the first frequency and second frequency is smaller than the CIR estimation frequency.

The present invention further discloses a control method for a decision feedback equalizer (DFE). The control method includes: generating a CIR estimation vector according to an input signal at a CIR estimation frequency; generating an FFE coefficient according to the CIR estimation vector at a first frequency; generating an FBE coefficient according to the CIR estimation vector and the FFE coefficient at a second frequency; generating a feed-forward equalization filtered result according to the input signal and the FFE coefficient; generating a feed-backward equalization filtered result according to a decision signal and the FBE coefficient; and generating an updated decision signal according to the feed-forward equalization result and the feed-backward equalization filtered result. At least one of the first frequency and second frequency is smaller than the CIR estimation frequency.

The DFE and control method are capable of updating the FFE coefficient and the FBE coefficient by different frequencies to reduce the computation load of the DFE, hence enhancing the performance of the DFE.

The above and other aspects of the invention will become better understood with regard to the following detailed description of the preferred but non-limiting embodiments. The following description is made with reference to the accompanying drawings.

DETAILED DESCRIPTION OF THE INVENTION

In possible implementation, one person having ordinary skill in the art can realize the present invention by selecting equivalent elements or steps based on the disclosure of the application. That is, the implementation of the present invention is not limited to the following embodiments.

Figure 1:
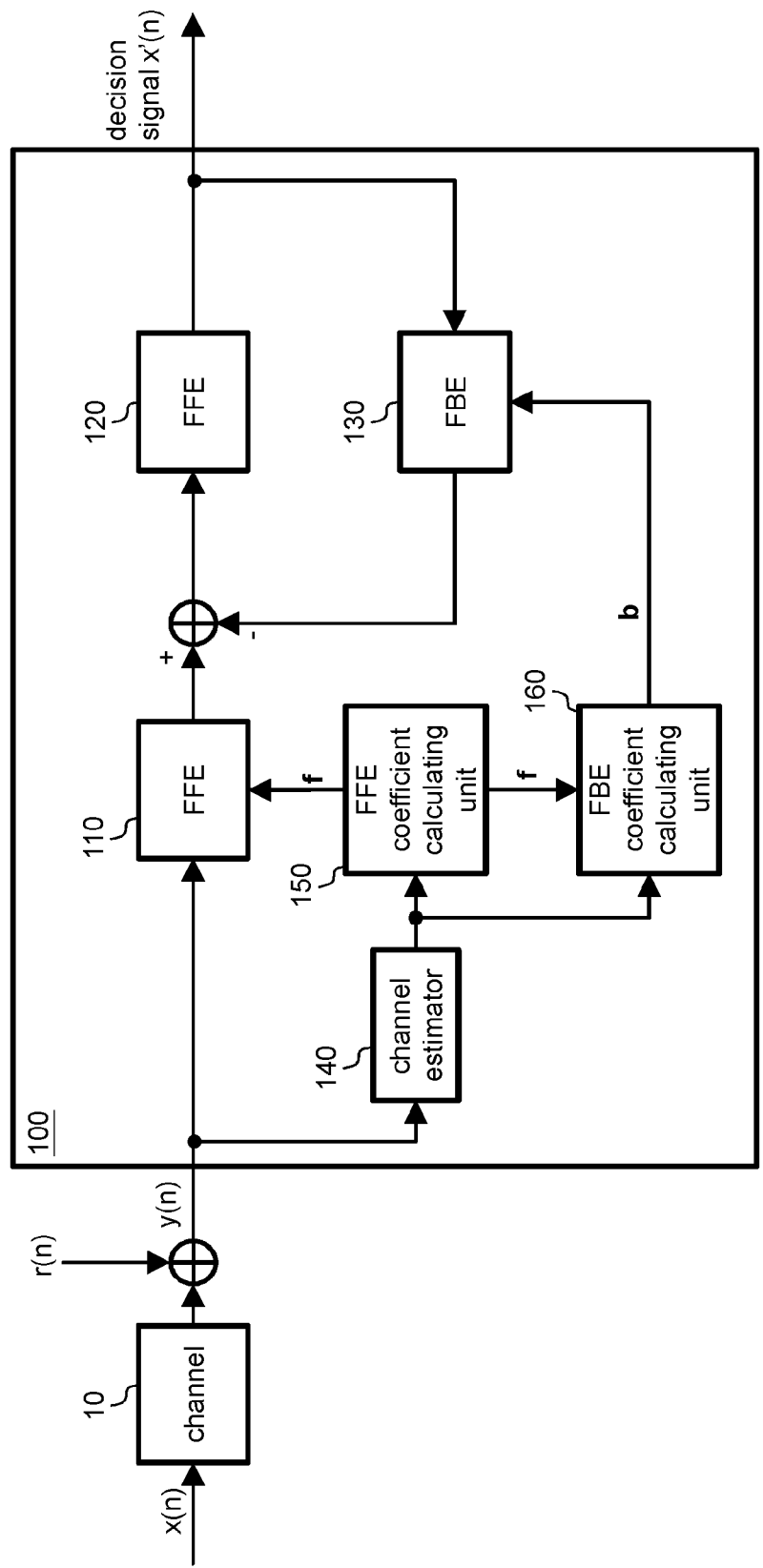
FIG. 1 is a functional block diagram of a conventional decision feedback equalizer (DFE)
Figure 2:
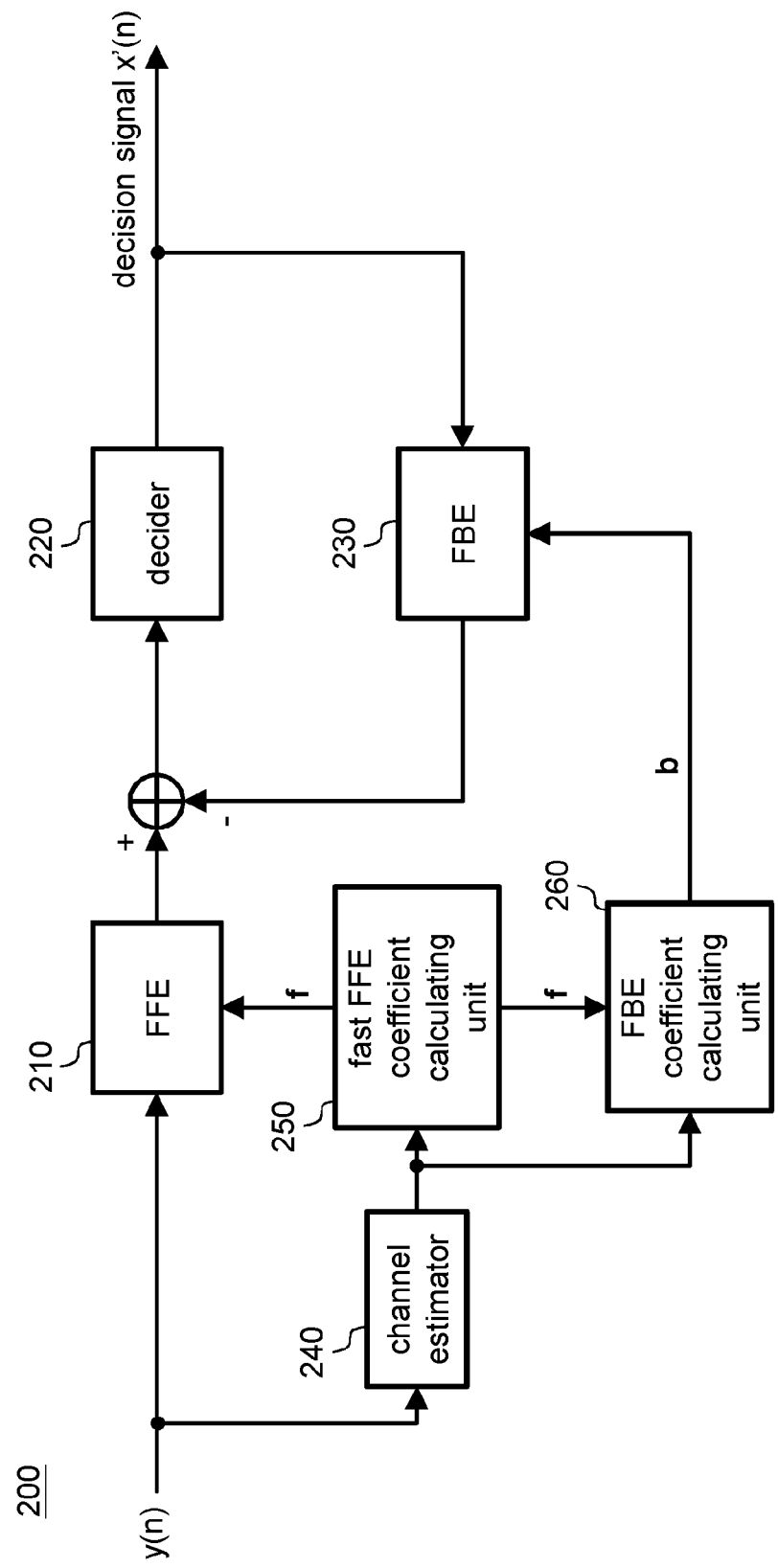
FIG. 2 is a functional block diagram of a DFE according to an embodiment of the present invention.

FIG. 2 shows a functional block diagram of a decision feedback equalizer (DFE) according to an embodiment of the present invention. The DFE 200 includes a feed-forward equalizer (FFE) 210, a decider 220, a feed-backward equalizer 230, a channel estimator 240, a fast FFE coefficient calculating unit 250 and a FBE coefficient calculating unit 260. The DFE 200 is a minimum mean square error decision feedback equalizer (MMSE-DFE) based on a fast transversal recursive squares (FT-RLS) algorithm.

When calculating the FFE coefficient f in equation (1) using the FT-RLS algorithm, the following iteration is performed. The number of iterations is determined according to the length $L_F$ of the FFE 220, and the following is performed for $L_F$:

1. updating a priori forward prediction error $\phi$;
2. updating a posteriori forward prediction error $\psi$;
3. updating a minimum cost of the forward predictor $\alpha$;
4. updating a conversion factor $\gamma$;
5. updating a normalized gain vector c; and
6. updating a forward prediction coefficient vector w.

The above iteration may be presented by a pseudo code, where "//" and the text on its right represent notes in the equation, and a parameter i is for controlling the progressing of the iteration:

```
// set initial value
γ = 1
w = 0
c = 0
α – σ²
// start iteration calculation
for ( i=0; i<L_F; i++) {
    φ = h[i];
    for (j=i-1, k=0; j>=0; j--, k++) {        //step1
        φ = φ – h[j]×w[k];
    }
    calculate ψ,α, γ //steps 2, 3, 4
```

$$\text{calculate next } c[0] = \frac{\phi^*}{\alpha} \text{ // step 5 initial calculation}$$

```
    for (j=1; j <L_F; j++) {                  //step 5
```

$$\text{next } c[j] = c[j-1] - \frac{\phi^*}{\alpha} w[j-1]$$

```
    }
    for (j=0;j<L_F; j++) {                    // step 6
        next w[j] = w[j] + c[j] × ψ
    }
    for (j=0;j<L_F; j++) {
        c[j] = next c[j]
        w[j] = next w[j]
    }
}
...
f=c×γ
```

After having performed the iteration including steps 1 to 6, the FFE coefficient f may then be updated according to the normalized gain vector c and the conversion factor γ. Details of the calculation in steps 2, 3 and 4 are generally known to one person having ordinary skill in the art, and shall be omitted in the above pseudo code.

The above pseudo code includes two layers of iteration operations—the outer iteration including above steps 1 to 6, and step 1, step 5 and step 6 that are respectively inner iterations. As steps 2, 3 and 4 do not involve iterative scalar operations, these steps have a lower computation complexity level. On the other hand, as steps 1, 5 and 6 involve iterative vector operations, these steps are key factors that affect the computation complexity of the above pseudo code. Further, the number of iterations of the inner iteration in step 1 is associated with the value of the parameter i, and the inner iteration in step 1 has a computation complexity of approximately $O(0.5L_F^2)$. The numbers of times of iterations of the inner iterations in steps 5 and 6 are associated with the value of the length $L_F$ of the FFE 220, and each of the inner iterations in steps 5 and 6 has a computation complexity of approximately $O(L_F^2)$. The total computation complexity of steps 2, 3 and 4 is approximately $O(2.5L_F^2 + L_F)$. The performance of the DFE can be effectively enhanced if the computation complexity of the FFE coefficient calculating unit can be lowered.

It is discovered through analysis that, step 5 of calculating the normalized gain vector c and step 6 of calculating the forward prediction coefficient vector w involve numerous computations of 0. More specifically, in different outer iterations, the normalized gain vector c and the forward prediction coefficient vector w are respectively represented by 1 and 2, wherein "x" only represents non-zero values instead of representing the same value.

TABLE 1

| | Normalized gain vector c | | | | | | |
|---|---|---|---|---|---|---|---|
| $N^{th}$ iteration | c[0] | c[1] | c[2] | c[3] | c[4] | ... | c[$L_F$ − 1] |
| 1 | x | 0 | 0 | 0 | 0 | ... | 0 |
| 2 | x | x | 0 | 0 | 0 | ... | 0 |
| 3 | x | x | x | 0 | 0 | ... | 0 |
| 4 | x | x | x | x | 0 | ... | 0 |
| 5 | x | x | x | x | x | ... | 0 |
| ... | ... | ... | ... | ... | ... | ... | 0 |
| $L_F$ | x | x | x | x | x | ... | x |

TABLE 2

| | Forward prediction coefficient vector w | | | | | | |
|---|---|---|---|---|---|---|---|
| $N^{th}$ iteration | w[0] | w[1] | w[2] | w[3] | w[4] | ... | w[$L_F$ − 1] |
| 1 | x | 0 | 0 | 0 | 0 | ... | 0 |
| 2 | x | x | 0 | 0 | 0 | ... | 0 |
| 3 | x | x | x | 0 | 0 | ... | 0 |
| 4 | x | x | x | x | 0 | ... | 0 |
| 5 | x | x | x | x | x | ... | 0 |
| ... | ... | ... | ... | ... | ... | ... | 0 |
| $L_F$ | x | x | x | x | x | ... | x |

It is discovered from Table-1 and Table-2 that, after the $1^{st}$ iteration (i=0) of the outer iteration, in the normalized gain vector c, apart from the element c[0], all the remaining elements are 0; in the forward prediction coefficient vector w, all the elements are 0. After the $2^{nd}$ iteration (i=1) of the outer iteration, in the normalized gain vector c, apart from the elements c[0] and c[1], all the remaining elements are 0; in the forward prediction coefficient vector w, apart from the element w[0], all the remaining elements are 0. The other iterations of the outer iteration are deduced accordingly. After the $L_F^{th}$ iteration (i=$L_F$−1) of the outer iteration, all of the elements in the normalized gain vector c are non-zero, and only the element w[$L_F$−1] in the forward prediction coefficient vector w is zero. It should be noted that, in this embodiment, i=0 corresponds to the $1^{st}$ iteration of the outer iteration, i=1 corresponds to the $2^{nd}$ iteration of the outer iteration, and so forth. In other embodiments, the initial value of the parameter i and the amount of change between two successive iterations may be different, and thus the $N^{th}$ iteration is in fact the number of iterations.

According to the above analysis, when the inner iteration of steps 5 and 6 are performed, instead of also computing the elements in 0 in the normalized gain vector c and the forward prediction coefficient vector w, only the non-zero elements in the normalized gain vector c and the forward prediction coefficient vector w are computed to save the computing time and hardware resources of the FFE coefficient calculating unit. More specifically, the number of iterations of the inner iteration (associated with the control parameter j) may be adjusted according to the number N of iterations (i.e., the $N^{th}$ iteration) currently performed in the outer iteration to reduce the computation amount of the inner iteration, where N=1~$L_F$. The pseudo code after the adjusted step 5 is as follows:

```
for (j=1 ; j < i+1 ; j++) {            //step 5
    next c[j] = c[j − 1] − (φ*/α) w[j − 1];
}
```

In the $N^{th}$ outer iteration, the number of iterations of step 5 is reduced from $L_F$−1 to N−1 times. More specifically, in the $1^{st}$ outer iteration (N=1), the number of iterations of step 5 is reduced from $L_F$−1 to 0 (i.e., no computation is required); in the $2^{nd}$ outer iteration (N=2), the number of iterations of step 5 is reduced from $L_F$−1 to 1; in the $3^{rd}$ outer iteration (N=3), the number of iterations of step 5 is reduced from $L_F$−1 to 2; in the ($L_F$−1)$^{th}$ outer iteration (N=$L_F$−1), the number of iterations of step 5 is reduced from $L_F$−1 to $L_F$−2; and in the $L_F^{th}$ outer iteration (N=$L_F$), the number of iterations of step 5 is kept unchanged as $L_F$−1. It is known that, the adjusted step 5 for calculating the normalized gain vector c has a computation complexity reduced from approximately $O(L_F^2)$ to $O(0.5L_F^2)$, and the computation amount of the fast FFE coefficient calculating unit 250 is reduced to a half of the original amount.

Similarly, the pseudo code of adjusted step 6 is as follows:

```
for (j=0 ; j<i ; j++) {                //step 6
    neat w[j] = w[j] + c[j] × ψ
}
```

In the $N^{th}$ outer iteration, the number of iterations of step 6 is reduced from $L_F$−1 to N−1 times. More specifically, in the $1^{st}$ outer iteration (N=1), the number of iterations of step 6 is reduced from $L_F$−1 to 0 (i.e., no computation is required); in the $2^{nd}$ outer iteration (N=2), the number of iterations of step 6 is reduced from $L_F$−1 to 1; in the $3^{rd}$ outer iteration (N=3), the number of iterations of step 6 is reduced from $L_F$−1 to 2; in the ($L_F$−1)$^{th}$ outer iteration (N=$L_F$−1), the number of iterations of step 6 is reduced from $L_F$−1 to $L_F$−2; and in the $L_F^{th}$ outer iteration (N=$L_F$), the number of iterations of step 6 is reduced to $L_F$−1. It is known that, the adjusted step 6 for calculating the normalized gain vector c has a computation complexity reduced from approximately $O(L_F^2)$ to $O(0.5L_F^2)$, and the computation amount of the fast FFE coefficient calculating unit 250 is reduced to a half of the original amount.

It should be noted that, the initial value of the control parameter j and the amount of change between two successive inner iterations may be different, and are correspondingly changed according to equations inside the loop. Such details are generally known to one person having ordinary skill in the art. Thus, the implementation of the present invention is not limited to the above pseudo code.

Figure 3:
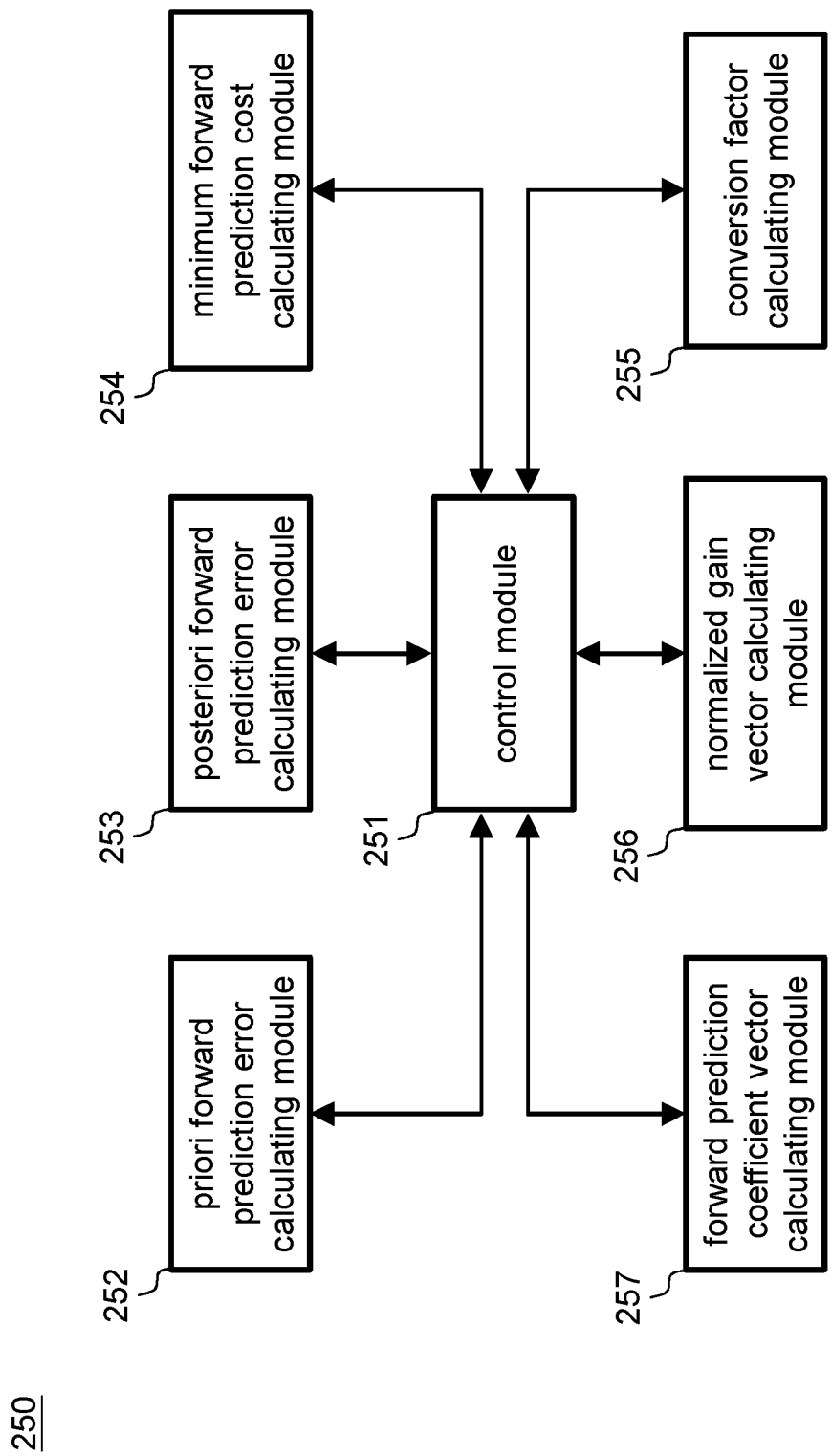
FIG. 3 is a functional block diagram of a fast FFE calculating unit according to an embodiment of the present invention.
Figure 4:
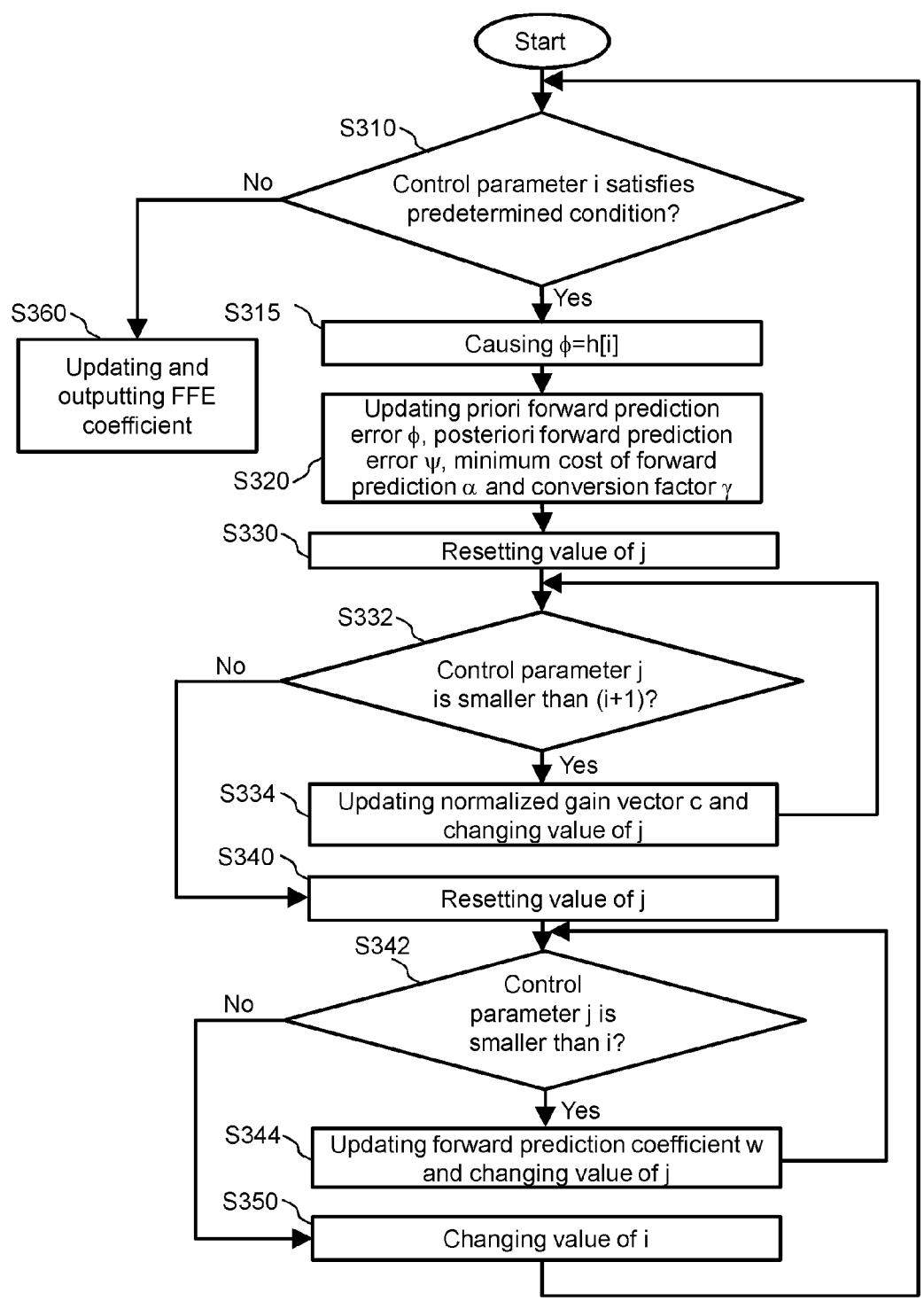
FIG. 4 is a flowchart of calculating the FFE coefficient f according to an embodiment of the present invention.

FIG. 3 shows a functional block diagram of the fast FFE coefficient calculating unit 250 according to an embodiment of the present invention. The fast FFE coefficient calculating unit 250 includes a control module 251, a priori forward prediction error calculating module 252, a posteriori forward prediction error calculating module 253, a minimum forward predictor cost calculating module 254, a conversion factor calculating module 255, a normalized gain vector calculating module 256, and a forward prediction coefficient vector calculating module 257. FIG. 4 shows a flowchart of a control module of the fast FFE coefficient calculating unit 250 of the present invention. First, the control module 251 determines whether to perform an outer iteration according to whether the control parameter i satisfies a predetermined condition (step S310). If the outer iteration is complete (a determination result of step S310 is negative), the control module 251 updates and outputs the FFE coefficient f (step S360). If the outer iteration is not complete (the determination result of step S310 is affirmative), the control module 251 causes the priori forward prediction error calculating module 252 to initialize the priori forward prediction error $\phi$, i.e., setting the initial value of the priori forward prediction error $\phi$ to be equal to h[i] (step S315) (h representing the CIR estimation vector). The control module 251 then controls the priori forward prediction error calculating module 252, the posteriori forward prediction error calculating module 252, the minimum forward predictor cost calculating module 252 and the conversion factor calculating module 255 to respectively update the parameters $\phi$, $\psi$, $\alpha$ and $\gamma$ (step S320, corresponding to steps 1 to 4 of the pseudo code). The subsequent steps S330, S332 and S334 are a $1^{st}$ inner iteration (corresponding to step 5 of the pseudo code), in which the control module 251 controls the normalized gain vector calculating module 256 according to the control parameter j to perform the iteration for updating the normalized gain vector c. It should be noted that, the control module 251 determines whether to perform the inner iteration by comparing the control parameter j with the control parameter i, implying that the number of iterations of the inner iteration is in fact associated with the number N of iterations of the outer iteration. The subsequent steps S340, S342 and S344 are the $2^{nd}$ inner iteration (corresponding to step 6 of the pseudo code), in which the control module 251 controls the forward prediction coefficient vector calculating module 257 according to the control parameter j to perform the iteration for updating the forward prediction coefficient vector w. The control parameter i is changed in step S350.

Figure 5:
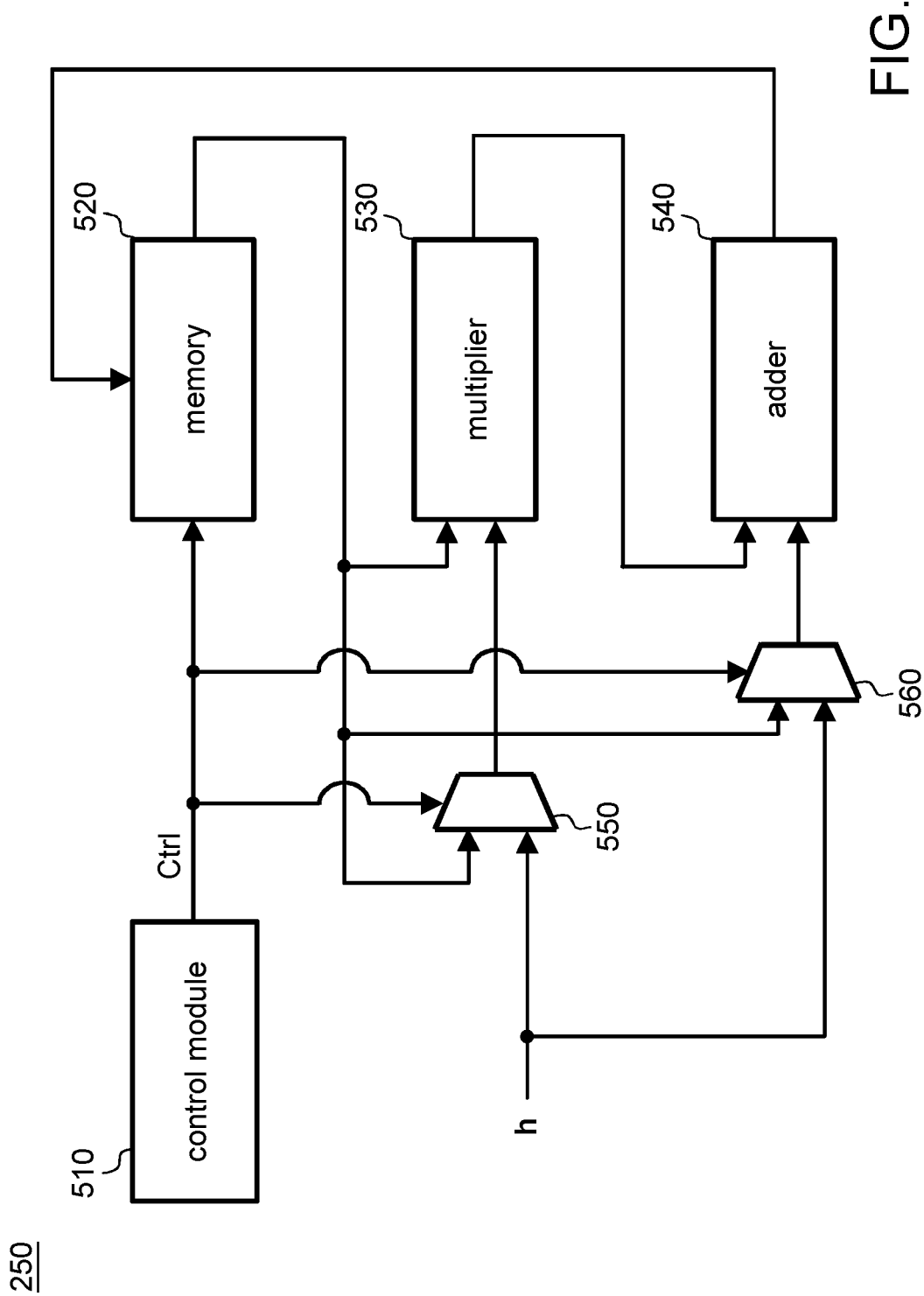
FIG. 5 is a functional block diagram of a fast FFE coefficient calculating unit implemented by a hardware circuit according to an embodiment of the present invention.

In practice, the fast FFE coefficient calculating unit 250 may be implemented by a hardware circuit. FIG. 5 shows the fast FFE coefficient calculating unit 250 in FIG. 3 implemented by a hardware circuit. For example, a control module 510 is a hardware logic circuit based on a finite state machine and controls the progressing of the process in FIG. 4. According to a control signal Ctrl outputted by the control module 510, multiplexers 550 and 560 select to output the CIR estimation vector h or values (e.g., the above parameters $\phi$, $\psi$, $\alpha$, $\gamma$, c and w) temporarily stored in a memory 520 to a multiplier 530 and an adder 540. The multiplier 530 and the adder 540 respectively perform multiplication and addition in the steps. The modules in FIG. 3 realize respective functions by executing corresponding codes through the hardware in FIG. 5.

It is known from the pseudo code that, step S334 in fact includes a multiplication $$\frac{\phi^*}{a} \times w[j-1]$$

and a subtraction $$c[j-1] - \left\{\frac{\phi^*}{a} \times w[j-1]\right\}.$$

Figure 6:
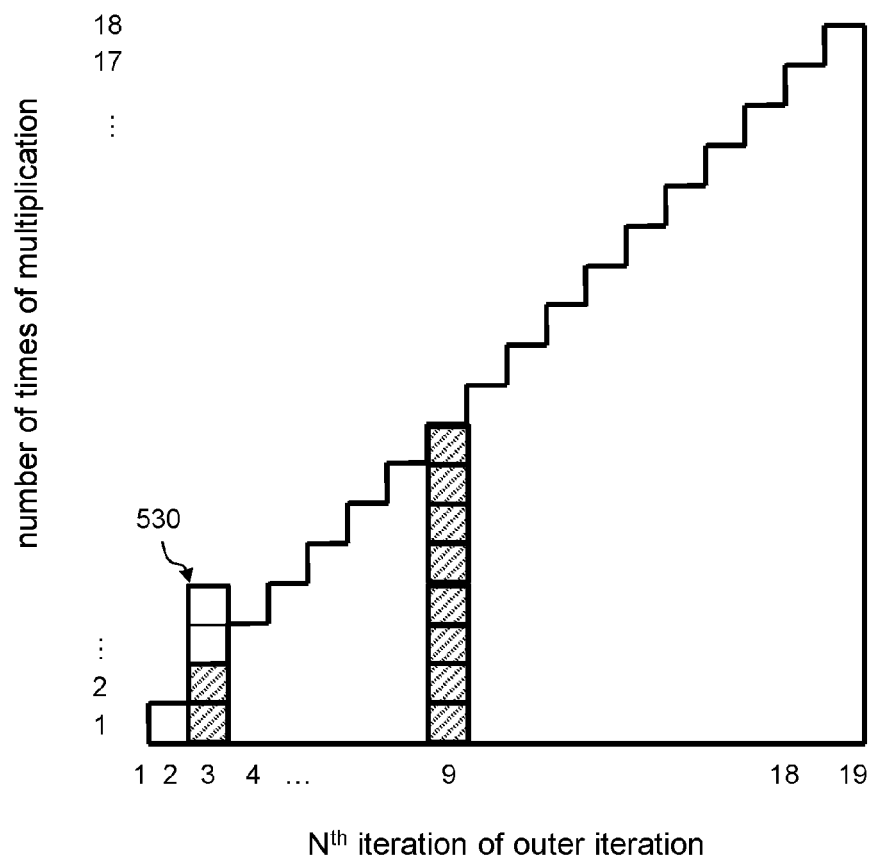
FIG. 6 is a diagram of a relationship between a multiplication computation amount and a multiplication array of the present invention.

The multiplication consumes more hardware resources and time, and is thus the main target of discussion. The multiplier 530 of the fast FFE coefficient calculating unit 250 is in fact a multiplication array (including a plurality of multiplying units) for performing the above multiplication. FIG. 6 shows a diagram of a relationship between a multiplication computation amount and a multiplication array. $L_F=19$ is taken as an example. It is assumed that the multiplier 530 includes 4 multiplying units. When N=3, step S334 is performed twice (because the number of the inner iteration is N−1), and so the multiplier 530 uses two of the multiplying units (the shaded parts); when N=9, step S332 is performed eight times, and the multiplier 530 is used twice (equivalent to eight multiplying units) to complete the required multiplication; and so forth. In a conventional method, regardless of the sequence of the outer iteration (regardless of the number N of iterations), step S334 is performed 18 times. Thus, even for the $1^{st}$ iteration (N=1, and the multiplier 530 is not used in the present invention), the multiplier 530 is used for more than four times. Comparing the two, it is discovered that, 1) under the same hardware resources, the time that the fast FFE coefficient calculating unit 250 of the present invention requires is only about one half of the time that the conventional method requires; or 2) given the computation needs to be completed within the same amount of time, hardware costs of the fast FFE coefficient calculating unit 250 are only about one half of those of the conventional method.

The same deduction applies to the $2^{nd}$ inner iteration (i.e., corresponding to step 6 of the pseudo code) corresponding to steps S340, S342 and S344. That is, step 6 of the pseudo code also saves one half of the time or one half of the hardware costs. Therefore, in the process in FIG. 4, when the number of iterations of the $1^{st}$ and $2^{nd}$ inner iterations are associated with the number N of iterations of the outer iteration, the computing time of the FFE coefficient calculating unit 250 can be saved to further significantly improve the performance of the FFE coefficient calculating unit 250. As such, not only the speed of generating the FFE coefficient f but also the speed at which the FBE coefficient calculating unit 260 generates the FBE coefficient b is accelerated, thereby enhancing the overall performance of the DFE or saving hardware resources of the FFE coefficient calculating unit 250.

In fact, step 1 for calculating the priori forward prediction error $\phi$ is also an iteration. Reducing the computation amount of the iteration helps saving the computing time of the FFE coefficient calculating unit 250 to further enhance the performance of the DFE or to save hardware resources of the FFE coefficient calculating unit 250. It is known from step 1 of the pseudo code that, the priori forward prediction error $\phi=\phi-h[j]\times w[k]$, where h[j] represents an element of the CIR estimation vector h. The CIR estimation vector h includes an $L_F$ number of elements, where $L_F$ is the length of the FFE 220. For example, the $L_F$ number of elements of the CIR estimation vector h are h[0], h[1], . . . , and $h[L_F-1]$. Further, the number of iterations in step 1 is determined by the number N of iterations the outer iteration currently performs. For example, in the $1^{st}$ outer iteration (N=1), the number of iterations of step 1 is zero (i.e., no computation is needed); in the $2^{nd}$ outer iteration (N=2), step 1 performs the iteration according to h[0] and has a number of iterations of 1; in the $3^{rd}$ outer iteration (N=3), step 1 performs the iteration according to h[1]~h[0] and has a number of iterations of 2; in the $4^{th}$ outer iteration (N=4), step 1 performs the iteration according to h[2]~h[0] and has a number of iterations of 3; in the $(L_F-1)^{th}$ outer iteration (N=$L_F$−1), step 1 performs the iteration according to $h[L_F-2]$~h[0] and has a number of iterations of $L_F$−2; and in the $L_F^{th}$ outer iteration (N=$L_F$), step 1 performs the iteration according to $h[L_F-1]$~h[0] and has a number of iterations of $L_F$−1. However, in most circumstances, only an $L_{CIR}$ number of elements in the $L_F$ number of elements of the CIR estimation vector h are greater than a predetermined value ($L_{CIR}<L_F$), whereas the remaining number ($L_F-L_{CIR}$) of elements are smaller than the predetermined value and may be regarded as zero, wherein $L_{CIR}$ may be regarded as the length of the CIR estimation vector h. For example, if an $L_F$ number of elements of the CIR estimation vector h are h[0]~h[$L_F$−1], $L_{CIR}$ number of elements h[0]~h[$L_F$−1] are greater than a predetermined value, the remaining number ($L_F-L_{CIR}$) of elements are smaller than the predetermined value and may be regarded as zero. According to the equation φ=φ−h[j]× w[k] of the priori forward estimation error φ in step 1, it is known that, when h[j]=0, φ is unchanged.

According to the above analysis, when the inner iteration of step 1 is performed, instead of also computing elements that are smaller than the predetermined value and may be regarded as zero elements in the CIR estimation vector h, only elements that are greater than the predetermined value (e.g., h[0]~h[$L_{CIR}$−1]) in the CIR estimation vector h are computed, so as to reduce the computing time or hardware resources of the FFE coefficient calculating unit 250. For example, the computation is performed only when the control parameter j is smaller than the length $L_{CIR}$ of the CIR estimation vector h. The pseudo code of the adjusted step 1 is as follows:

```
for (j=i-1, k=0; j>=0; j--, k++) {      //step 1
    if (j <L_CIR)
φ -= h[j] × w[k];
}
```

Figure 7:
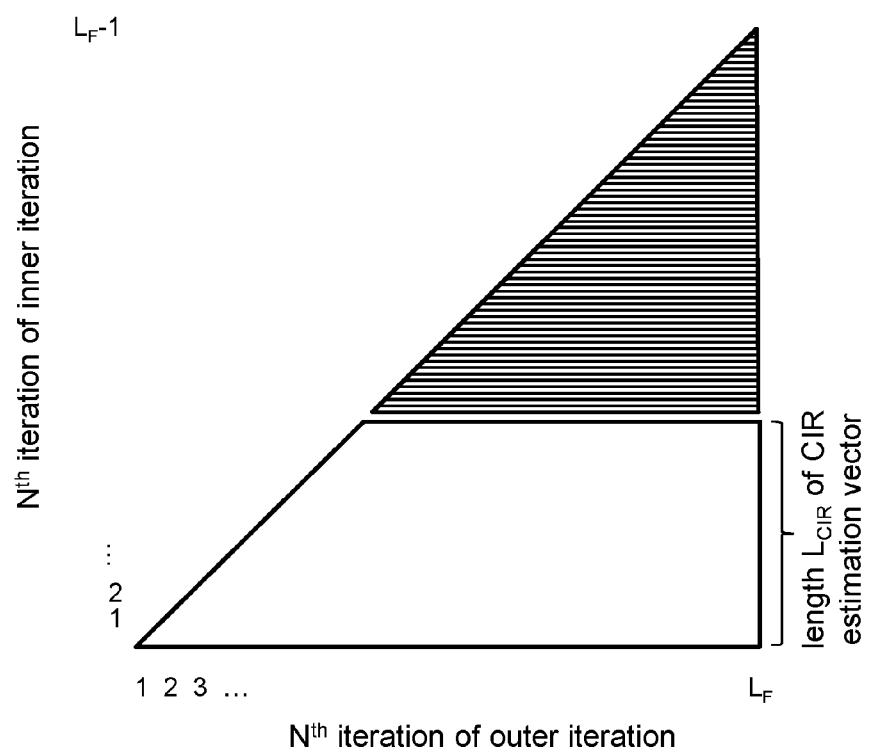
FIG. 7 is a comparison diagram of computation amounts for updating a priori forward prediction error of a conventional solution and the present invention.

Referring to FIG. 7 for the achieved effect, regardless of the number N of iterations of the outer iteration, the number of iterations of step 1 does not exceed the length $L_{CIR}$ of the CIR estimation vector h. That is to say, during the entire process of the outer iteration, the adjusted step 1 saves the computation amount represented by the shaded area.

Figure 8A:
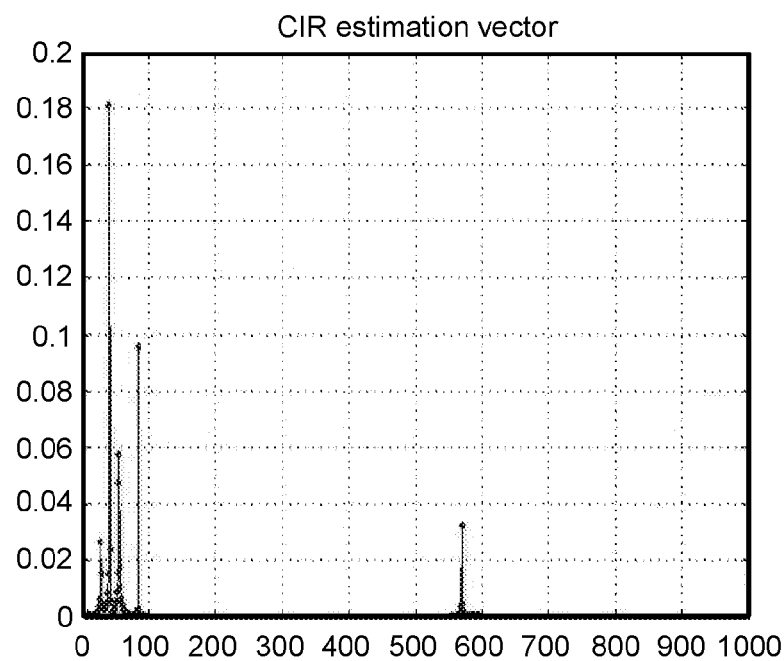
FIG. 8A is a waveform diagram of the CIR estimation vector h.
Figure 8B:
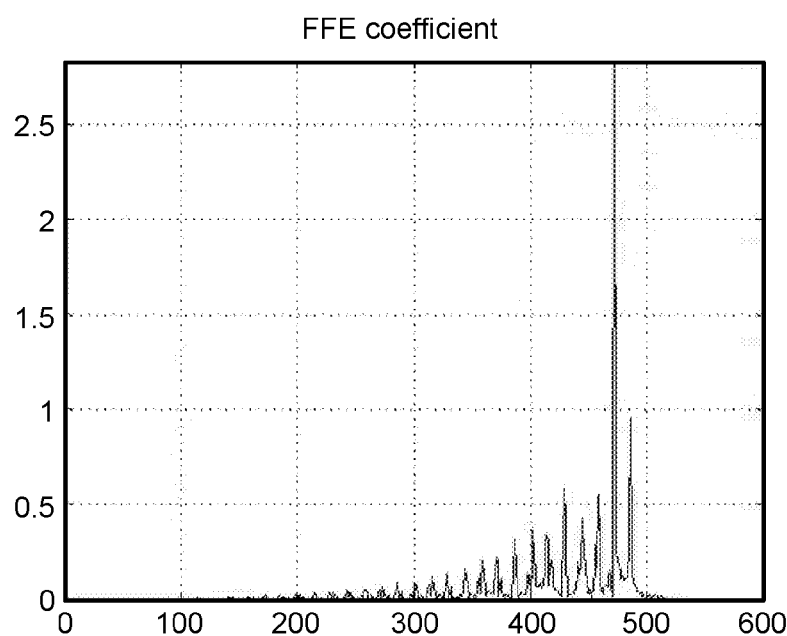
FIG. 8B is a waveform diagram of the FFE coefficient f.

In addition to reducing the computation amount of the FFE coefficient calculating unit 250 by adjusting the computing approaches of steps 1, 5 and 6 of equation (1), the present invention is also capable of reducing the computation amount of the FBE coefficient calculating unit 260 by adjusting the computing approach of equation (2). In one embodiment, as shown by the waveforms of the CIR estimation vector h and the FFE coefficient f in FIG. 8A and FIG. 8B, respectively, it is found that most parts of the waveforms in FIG. 8A and FIG. 8B are zero. It is also known from equation (2) that, the FBE coefficient b is the product of the two (b=$H^H$xf), such that the FBE coefficient calculating unit 260 may calculate the FBE coefficient b only when both of them are non-zero, thereby significantly reducing the computation amount of the FBE coefficient calculating unit 260.

The multiple elements of the CIR estimation vector h represent multiple paths. Paths can be categorized into static paths and dynamic paths. For example, an immobile building may form a static path, whereas a Doppler effect generated by a moving vehicle may form a dynamic path. In the presence of few dynamic paths among multiple paths, the change rate of at least one of the pre-cursor inter-symbol interference signals and post-cursor inter-symbol interference signals in the input signal y(n) is lowered, such that at least one of the change rate of the optimum FFE coefficient f and the change rate of the optimum FBE coefficient b is reduced. Thus, according to such characteristic, the present invention reduces at least one of a computation frequency of the FFE coefficient f and a computation frequency of the FBE coefficient b, so as to allow the DFE 200 to have higher performance given the same hardware resources.

Figure 14:
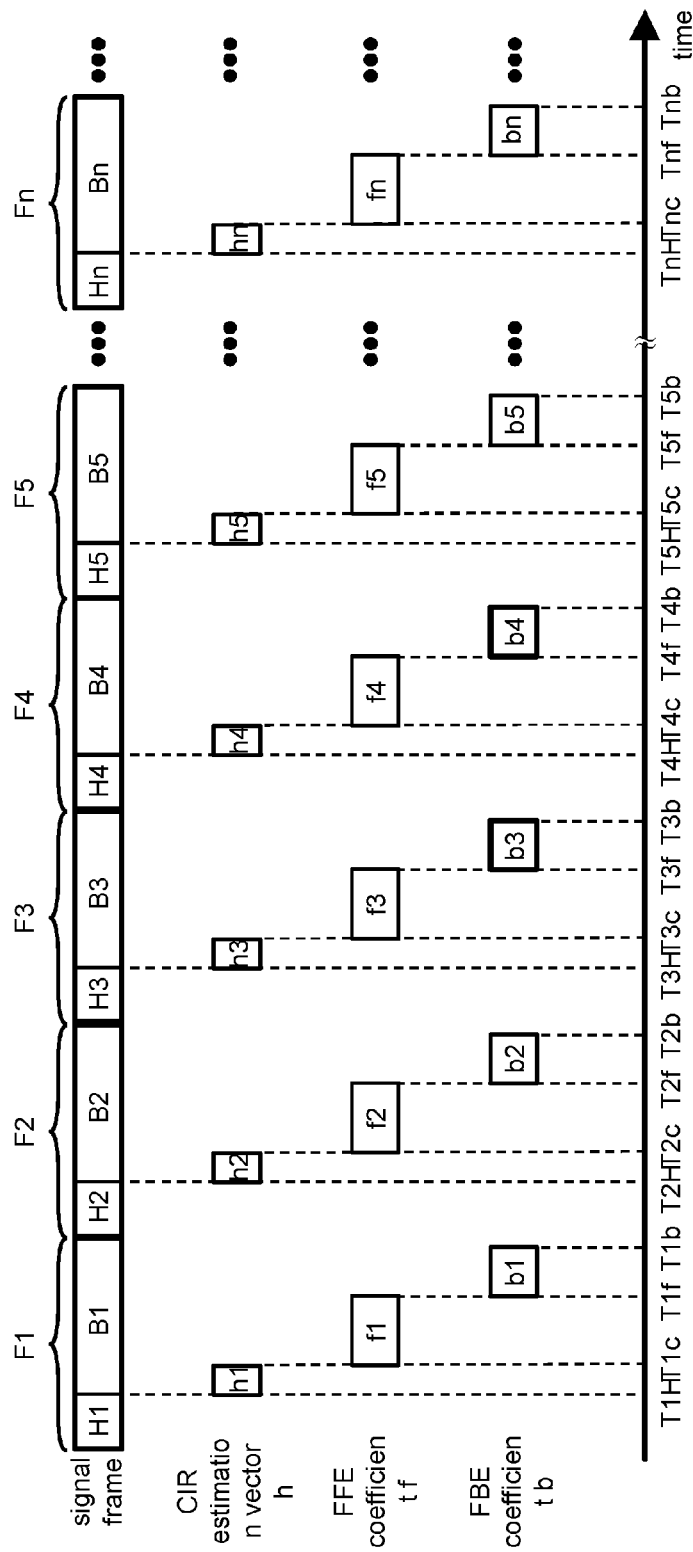
FIG. 14 is a timing diagram of the DFE 200 calculating the FFE coefficient f and the FBE coefficient b according to another embodiment of the present invention.

FIG. 14 shows a timing diagram of the DFE 200 calculating the FFE coefficient f and the FBE coefficient b according to an embodiment of the present invention. When the DFE 200 is applied to digital communication based on frames (e.g., Digital Terrestrial Multimedia Broadcast (DTMB) or Digital Video Broadcasting-Terrestrial (DVB-T)), the first row represents signal frames fed into the DFE 200. Each of the signal frames includes a header and a data body. For example, the $1^{st}$ signal frame F1 includes a header H1 and a data body B1, the $2^{nd}$ signal frame includes a header H2 and a data body B2, and so forth. The second row represents the CIR estimation vector h that the channel estimator 240 sequentially generates according to the headers of the signal frames. More specifically, after completely obtaining the header H1 of the $1^{st}$ signal frame (at a time point T1H), the channel estimator 240 starts calculating a $1^{st}$ CIR estimation vector h1 according to the header H1, and completes the calculation at a time point T1c. Similarly, after completely obtaining the header H2 of the $2^{nd}$ signal frame F2 (at a time point T2H), the channel estimator 240 starts calculating a $2^{nd}$ CIR estimation vector h2 according to the header H2, and completes the calculation at a time point T2c; and so forth. The third row is the FFE coefficient f that the fast FFE coefficient calculating unit 250 sequentially generates according to the CIR estimation vector h. More specifically, after the channel estimator 240 completes calculating the first CIR estimation vector h1 (the time point T1c), the fast FFE coefficient calculating unit 250 starts calculating a first FFE coefficient f1 according to the first CIR estimation vector h1 after the channel estimator 240 completes calculating the second CIR estimation vector h2 (the time point T2c), the fast FFE coefficient calculating unit 250 starts calculating a second FFE coefficient f2 according to the second CIR estimation vector h2; and so forth. The fourth row represents the FBE coefficient b that the FBE coefficient calculating unit 260 generates according to the CIR estimation vector h and the FFE coefficient f. More specifically, after the fast FFE coefficient calculating unit 250 completes calculating the first FFE coefficient f1 (at the time point T1f), the FBE coefficient calculating unit 260 starts calculating a first FBE coefficient b1 according to the first CIR estimation vector h1 and the first FFE coefficient f1, after the fast FFE coefficient calculating unit 250 completes calculating the second FFE coefficient f2 (at the time point T2f), the FBE coefficient calculating unit 260 starts calculating a second FBE coefficient b2 according to the first CIR estimation vector h2 and the second FFE coefficient f2; and so forth.

Under circumstances that there are only few dynamic paths in multiple paths and the delay periods of the dynamic paths are longer than those of the other static paths, the changing rate of the pre-cursor interference signals in the input signal y(n) is lowered, such that the changing rate of the optimum FFE coefficient f is reduced. As the computation complexity of the FFE coefficient f is far greater than the computation complexity of the FBE coefficient b, if the frequency at which the fast FFE coefficient calculating unit 250 generates the FFE coefficient f could be decreased, and given the same hardware resources, the performance of the DFE 200 may be significantly increased.

Figure 9:
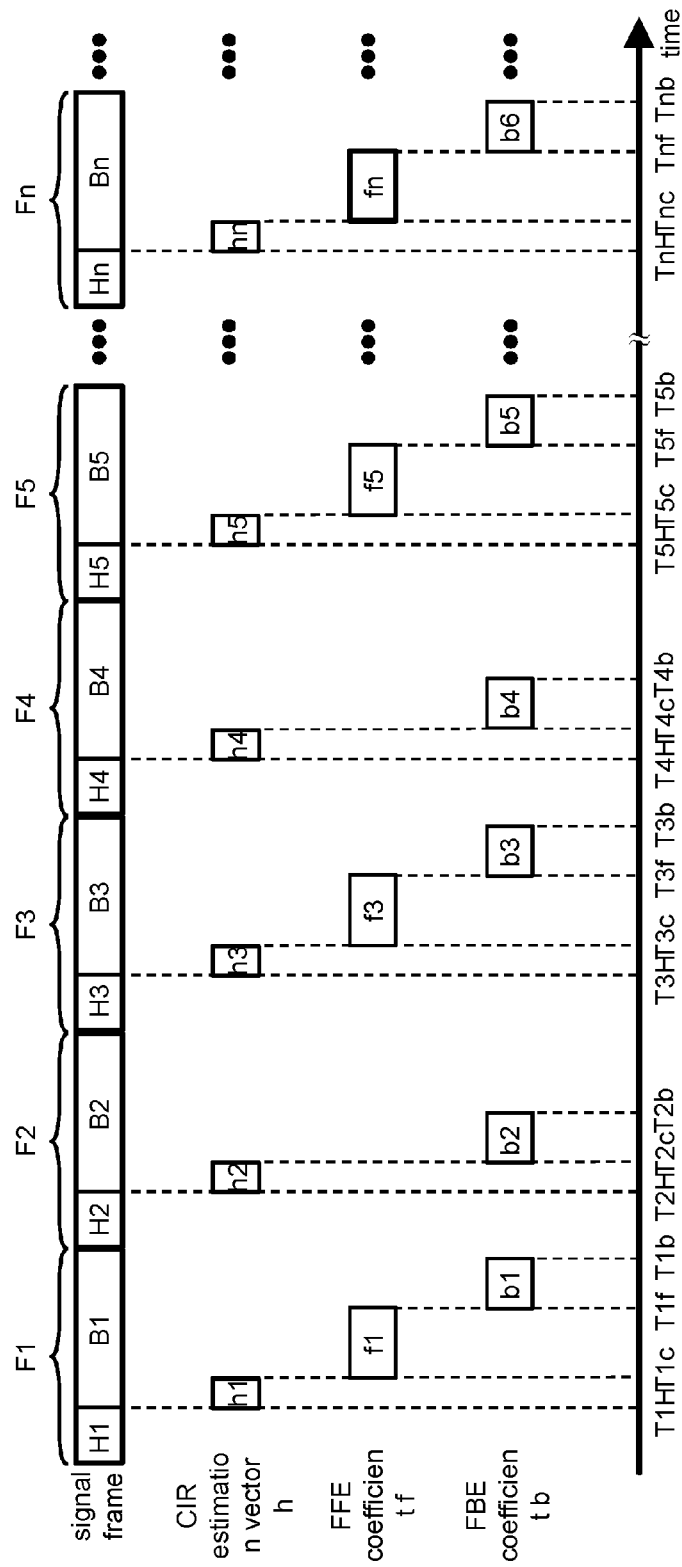
FIG. 9 is a timing diagram of the DFE 200 calculating the FFE coefficient f and the FBE coefficient b by different frequencies according to an embodiment of the present invention.

FIG. 9 shows a timing diagram of the DFE 200 calculating the FFE coefficient f and the FBE coefficient b at different frequencies according to an embodiment of the present invention. In the embodiment, the frequency at which the fast FFE coefficient calculating unit 250 calculates the FFE coefficient f is a half of the generating frequency of the CIR estimation vector h, and the frequency at which the FBE coefficient calculating unit 260 generates the FBE coefficient b is equal to the generating frequency of the CIR estimation vector h. More specifically, during the period of the $1^{st}$ signal frame F1, the fast FFE coefficient calculating unit 250 calculates the $1^{st}$ FFE coefficient f1 according to the $1^{st}$ CIR estimation vector h1, and the FBE coefficient calculating unit 260 calculates the $1^{st}$ FBE coefficient b1 according to the $1^{st}$ CIR estimation vector h1 and the $1^{st}$ FFE coefficient f1, during the period of the $2^{nd}$ signal frame F2, the fast FFE coefficient calculating unit 250 does not calculate a new FFE f, and the FBE coefficient calculating unit 260 calculates the $2^{nd}$ FBE coefficient b2 according to the $2^{nd}$ CIR estimation vector h2 and the $1^{st}$ FFE coefficient f1 after the calculation of the $2^{nd}$ CIR estimation vector h2 is completed (at the time point T2c); during the $3^{rd}$ signal frame F3, the fast FFE coefficient calculating unit 250 calculates the $3^{rd}$ FFE coefficient f3 according to the $3^{rd}$ CIR estimation vector h3, and the FBE coefficient calculating unit 260 calculates the $3^{rd}$ FBE coefficient b3 according to the $3^{rd}$ CIR estimation vector h3 and the $3^{rd}$ FEE coefficient f3; during the $4^{th}$ signal frame F4, the fast FFE coefficient calculating unit 250 does not calculate a new FFE coefficient f, and the FBE coefficient calculating unit 260 calculates the $4^{th}$ FBE coefficient b4 according to the $4^{th}$ CIR estimation vector h4 and the $3^{rd}$ FFE coefficient f3 after the calculation of the $4^{th}$ CIR estimation vector h4 is completed (at the time point T4c); and so forth.

The calculated FFE coefficient f and FBE coefficient b are for updating filtering coefficients of the FFE 210 and the FBE 230, respectively. The filtering coefficients of the FFE 210 and the FBE 230 may be updated synchronously or asynchronously. In an embodiment where the filtering coefficients of the FFE 210 and the FBE 230 are updated asynchronously, because the generating speed of the FBE coefficient b is higher than the generating speed of the FFE coefficient f, the speed at which the FBE 230 updates the filtering coefficient may be higher than the speed at which the FFE 210 updates the filtering coefficient. For example, in FIG. 9, each time the FBE coefficient b has been calculated (at time pints T1b, T2b, T3b . . . ), the FBE 230 updates the filtering coefficient according to the most recently generated FBE coefficient b; each time the FFE coefficients f1, f3, f5 . . . have been calculated (at time points T1f, T3f, T5f . . . ), the FFE 210 updates the filtering coefficient according to the FFE coefficients f1, f3, f5 . . . . In certain applications, the FFE 210 and the FBE 230 synchronously updated provide preferred performance. At this point, the one having a slower computation frequency, e.g., the computation for the FFE coefficient f, may be updated jointly according to a previous result and a computed result of the current FBE coefficient b. More specifically, in an embodiment of synchronous update, during the $1^{st}$ signal frame F1, the FFE 210 updates the filtering coefficient at the time point T1f according to the $1^{st}$ FFE coefficient f1, and the FBE 230 updates the filtering coefficient at the time point T1b according to the $1^{st}$ FBE coefficient b1, during the $2^{nd}$ signal frame F2, the FFE 210 again updates the filtering coefficient similarly according to the $1^{st}$ FFE coefficient f1, and the FBE 230 updates the filtering coefficient at the time point T2b according to the $2^{nd}$ FBE coefficient b2; and so forth.

Figure 10:
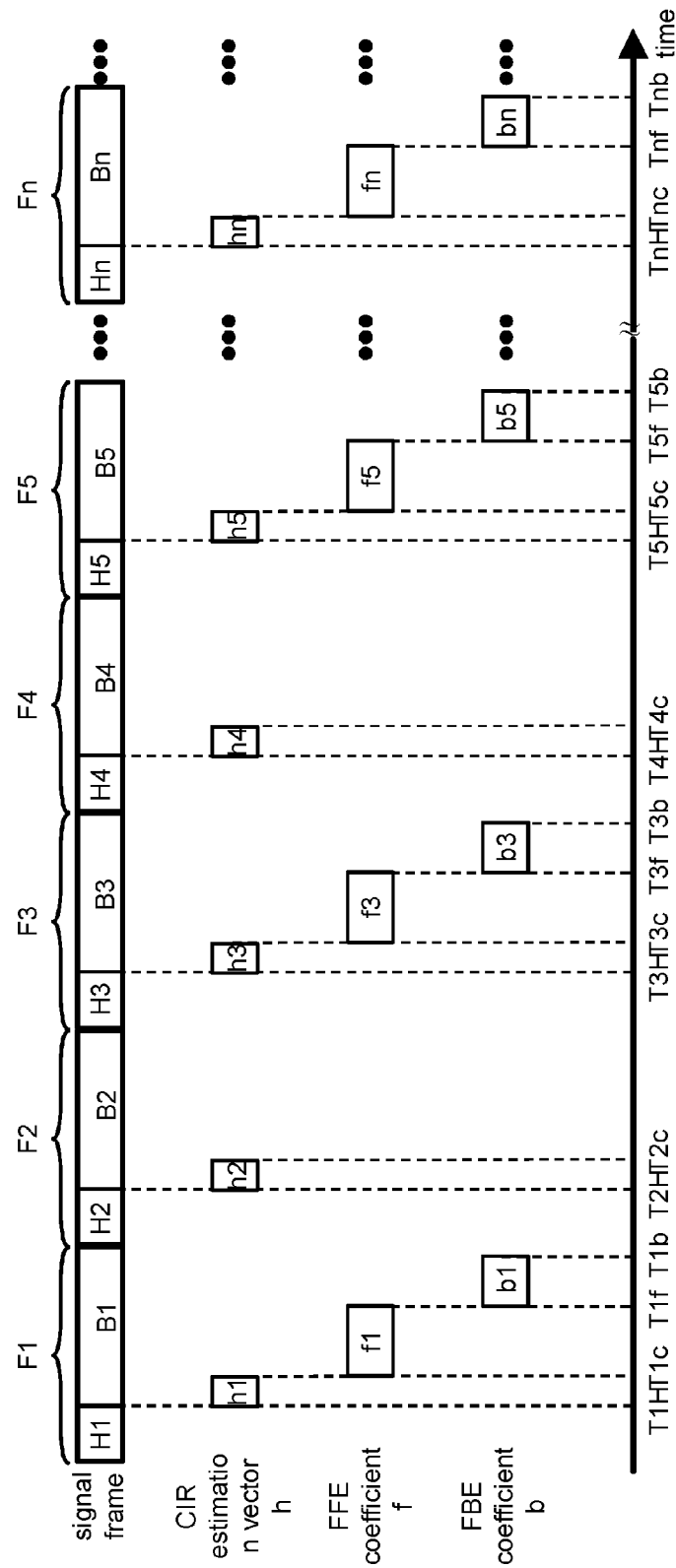
FIG. 10 is a timing diagram of the DFE 200 calculating the FFE coefficient f and the FBE coefficient b by different frequencies according to another embodiment of the present invention.

FIG. 10 shows a timing diagram of the DFE 200 calculating the FFE coefficient f and the FBE coefficient b by different frequencies according to another embodiment of the present invention. Different from the previous embodiment, in this embodiment, the frequency at which the fast FFE coefficient calculating unit 250 calculates the FFE coefficient f and the frequency at which the FBE coefficient calculating unit 260 calculates the FBE coefficient b are both a half of the generating frequency of the CIR estimation vector h. More specifically, during the $1^{st}$ signal frame F1, the fast FFE coefficient calculating unit 250 calculates the $1^{st}$ FFE coefficient f1 according to the $1^{st}$ CIR estimation vector h1, and the FBE coefficient calculating unit 260 calculates the $1^{st}$ FBE coefficient b1 according to the $1^{st}$ CIR estimation vector h1 and the $1^{st}$ FFE coefficient f1, during the $2^{nd}$ signal frame F2, the fast FFE coefficient calculating unit 250 does not calculate a new FFE coefficient f, and the FBE coefficient calculating unit 260 does not calculate a new FBE coefficient b, either; during the $3^{rd}$ signal frame F3, the fast FFE coefficient calculating unit 250 calculates the $3^{rd}$ FFE coefficient f3 according to the $3^{rd}$ CIR estimation vector h3, and the FBE coefficient calculating unit 260 calculates the $3^{rd}$ FBE coefficient b3 according to the $3^{rd}$ CIR estimation vector h3 and the $3^{rd}$ FFE coefficient f3; during the $4^{th}$ signal frame F3, the fast FFE coefficient calculating unit 250 does not calculate a new FFE coefficient f, and the FBE coefficient calculating unit 260 does not calculate a new FBE coefficient b, either; and so forth.

In the embodiment in FIG. 10, the FFE 210 and the FBE 230 synchronously update respective filtering coefficients, i.e., the respective filtering coefficients are updated synchronously during signal frames F1, F3, F5 . . . .

In practice, the fast FFE coefficient calculating unit 250 and the FBE coefficient calculating unit 260 may determine the frequencies of calculating the filtering coefficients according to the change rate of the CIR estimation vector h of the channel estimator 240. When the pre-cursor interference signals in the input signal y(n) change at a slow rate, the DFE 200 is capable of achieving a satisfactory effect without quickly calculating the FFE coefficient f, and thus the calculating frequency of the FFE coefficient calculating unit 250 can be correspondingly reduced to reduce the power consumption of the system. Similarly, when the post-cursor interference signals in the input signal y(n) change at a slow rate, the DFE 200 is capable of achieving a satisfactory effect without quickly updating the FBE coefficient b, and thus the calculation frequency of the FBE coefficient calculating unit 260 can be correspondingly reduced to further lower the computation amount of the system and to reduce the power consumption of the system. The change levels of the pre-cursor interference signals and the post-cursor interference signals may be learned through comparing current and previous CIR estimation vectors h. In one embodiment, the channel estimator 240 may generate a control signal after comparing the CIR estimation vectors h to notify the FFE coefficient calculating unit 250 and the FBE coefficient calculating unit 260. The FFE coefficient calculating unit 250 and the FBE coefficient calculating unit 260 then determine the frequencies at which the FFE coefficient f and the FBE coefficient b are calculated according to the control signal. In other embodiments, if it can be determined in advance that the change rate of the pre-cursor interference signals is slower than the change rat of the post-cursor interference signals in the input signal y(n) in the application environment of the DFE 200, the calculation frequency of the FFE coefficient calculating unit 250 and the calculation frequency of the FBE coefficient calculating unit 260 may be configured to a fixed ratio, and the frequencies for calculating the FFE coefficient f and the FBE coefficient b may be predetermined, e.g., 1:2 as shown in FIG. 9.

Figure 11:
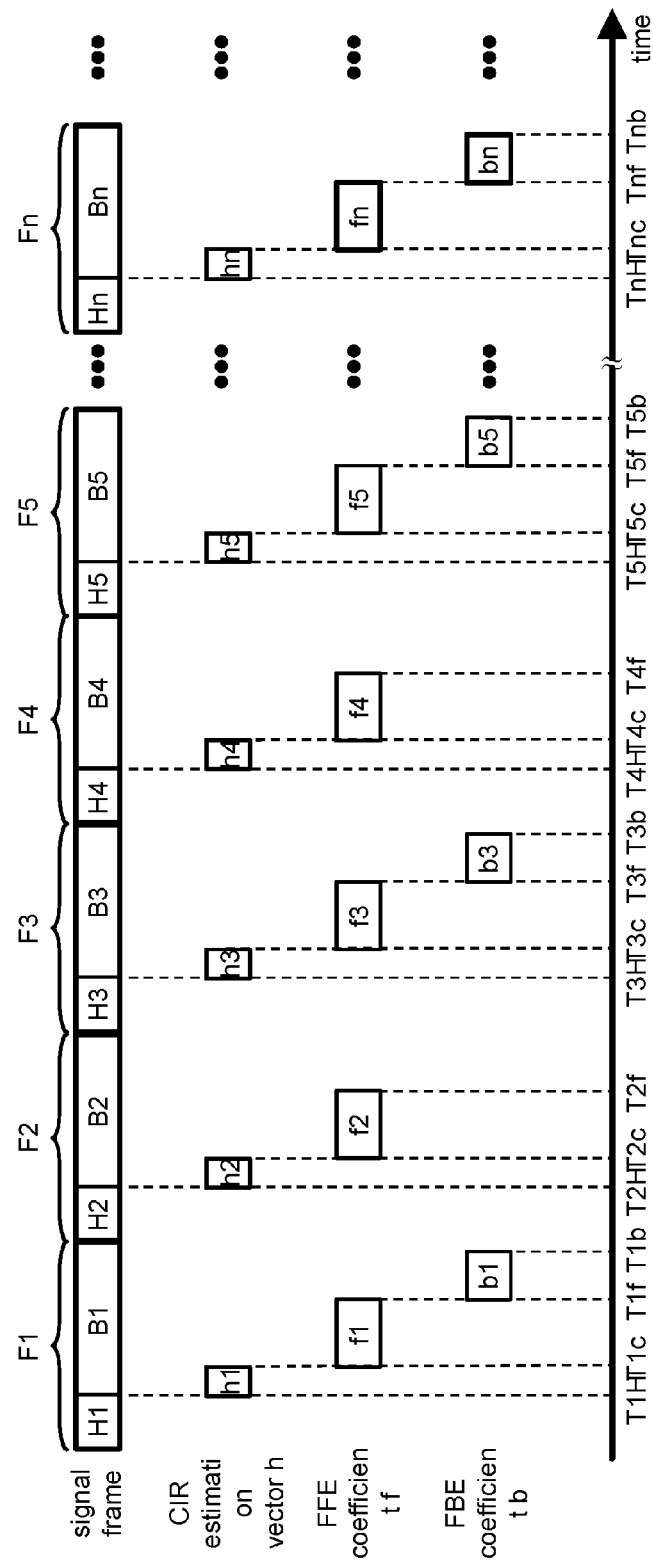
FIG. 11 is a timing diagram of the DFE 200 calculating the FFE coefficient f and the FBE coefficient b by different frequencies according to another embodiment of the present invention.

It should be noted, the fast FFE coefficient calculating unit 250 involves more complicated computation. Therefore, in circumstances where permitted, in order to effectively reduce the overall computation amount of the DFE 200, reducing the calculation frequency of the fast FFE coefficient calculating unit 250 is prioritized. However, in other embodiments, the calculation frequency of the fast FFE coefficient calculating frequency 250 may also be designed to be higher than the calculation frequency of the FBE coefficient calculating unit 260 (as shown in FIG. 11). At this point, the frequency at which the FFE 210 updates the filtering coefficient may be higher than the frequency at which the FBE 230 updates the filtering coefficient, or the two may update synchronously.

Figure 12:
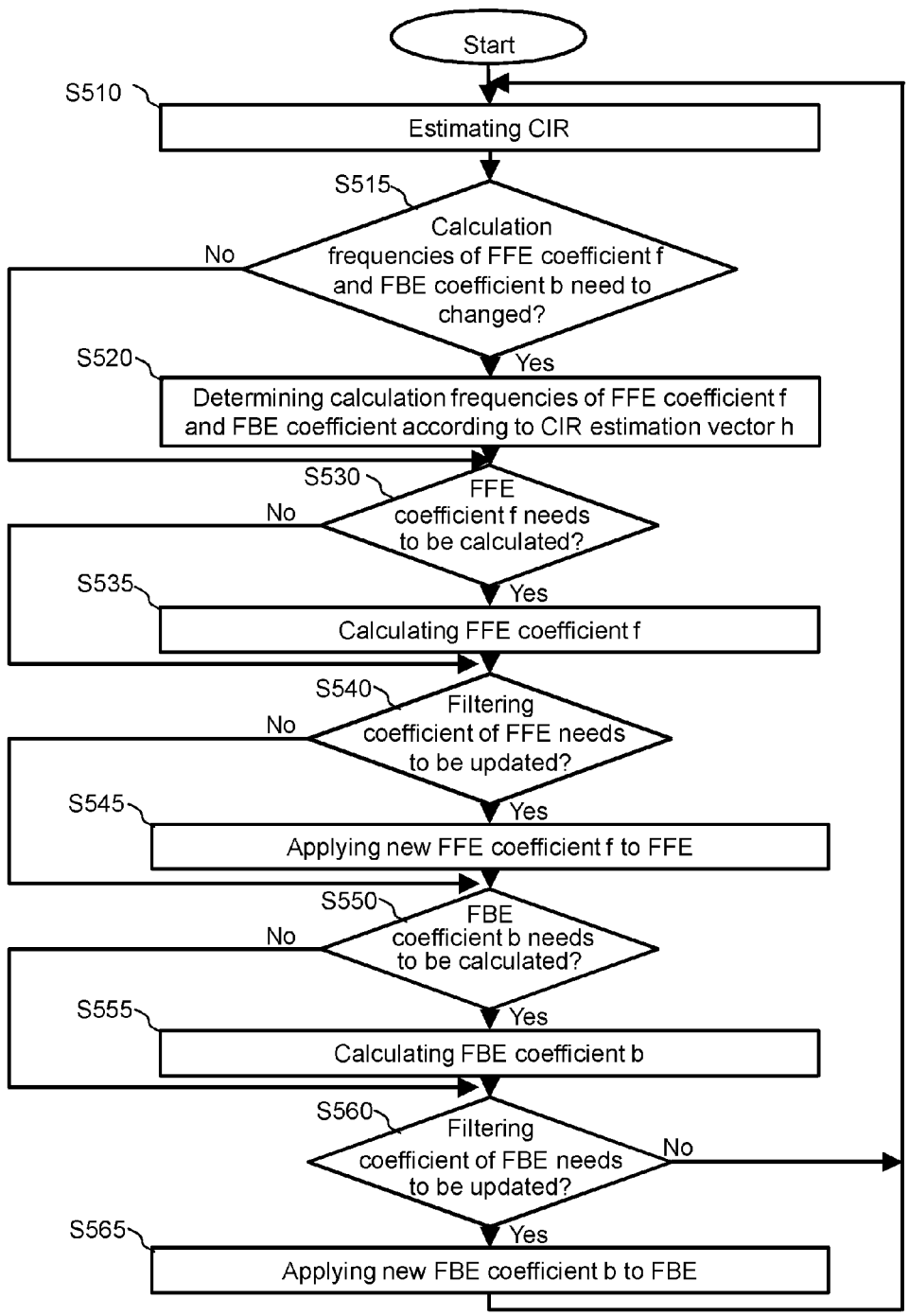
FIG. 12 is a flowchart of the DFE 200 calculating the FFE coefficient f and the FBE coefficient b by different frequencies according to an embodiment of the present invention.

FIG. 12 is a flowchart of the DFE 200 calculating the FFE coefficient f and the FBE coefficient b by different frequencies according to an embodiment of the present invention. After having completed the CIR estimation (step S510), it is determined whether to change the calculation frequencies of the FFE coefficient f and the FBE coefficient b (step S515). If so (e.g., the calculation frequencies of the two have not yet been decided or the CIR estimation vector h contains a drastic change), the calculation frequencies of the FFE coefficient f and the FBE coefficient b are determined according to the CIR estimation vector h (step S520). If not, step S530 is performed to determine whether to calculate the FFE coefficient f. The new FFE coefficient f is calculated (step S535) if it is determined to calculate the FFE coefficient f, or else it is determined whether to update the filtering coefficient of the FFE (step S540) if it is determined not to calculate the FFE coefficient f or if the calculate the FFE coefficient f has been calculated. The new FFE coefficient f is applied or loaded to the FFE (step S545) if the filtering coefficient of the FFE is to be updated, or else it is determined whether to calculate the FBE coefficient b (step S550) if the filtering coefficient of the FFE is not to be updated. The new FBE coefficient b is calculated (step S555) if the FBE coefficient b is to be calculated, or else it is determined whether to update the filtering coefficient of the FBE (step S560) if the FBE coefficient b is not to be calculated or has already been calculated. The new FBE coefficient b is applied to loaded to the FBE if the filtering coefficient of the FBE is to be updated (step S565), or else the next CIR estimation vector h is calculated if the filtering coefficient of the FBE is not to be updated or has already been updated (S510).

The determinations of steps S530 and S550 may be performed by the channel estimator 240, and the fast FFE coefficient calculating unit 250 and the FBE coefficient calculating unit 260 are then correspondingly controlled. For example, when the channel estimator 240 discovers that the corresponding equalizer coefficient calculating unit needs to calculate the coefficient, the channel estimator 240 notifies the need for calculation using the control signal. Alternatively, the determinations of steps S530 and S550 may be respectively performed by the fast FFE coefficient calculating unit 250 and the FBE coefficient calculating unit 260. For example, the fast FFE coefficient calculating unit 250 and the FBE coefficient calculating unit 260 respectively store the calculation frequencies (e.g., represented by control parameters or stored in a buffer), and perform the determinations according to the number of times of receiving the CIR estimation vector h and the calculation frequencies.

A first frequency according to which the FFE coefficient f is calculated and a second frequency according to which the FBE coefficient b is calculated may utilize the frequency of the signal frames or the generating frequency of the CIR estimation vector h as reference In the embodiment in FIG. 9, when the process in FIG. 12 is performed every two times, the determination result of step S530 is affirmative for only once, and the determination result of step S550 is affirmative in both times. For the embodiment in FIG. 10, when the process in FIG. 12 is performed every two times, the determination results of both step S530 and step S550 are affirmative for only once. In the embodiment in FIG. 11, when the process in FIG. 12 is performed every two times, the determination result of step S530 is affirmative in both times, and the determination result of step S550 is affirmative for only once. That is to say, in the present invention, by adjusting the calculation frequency of at least one of the FBE coefficient f and the FBE coefficient b (e.g., by appropriately adjusting the determination condition of at least one of steps S530 and S550) to cause that calculation frequency to be lower than the frequency of the signal frames or the generating frequency of the CIR estimation vector h, the computation amount of the DFE 200 may be effectively reduced. As the computation amount for calculating the FFE coefficient f is larger, the performance of the DFE can be noticeably improved by reducing the calculation frequency of the FFE coefficient f. Further, as previously described, if the calculation frequency of the fast FFE coefficient calculating unit 250 and the calculation frequency of the FBE coefficient calculating unit 260 are determined in advance, steps S515 and S520 may be omitted.

Figure 13:
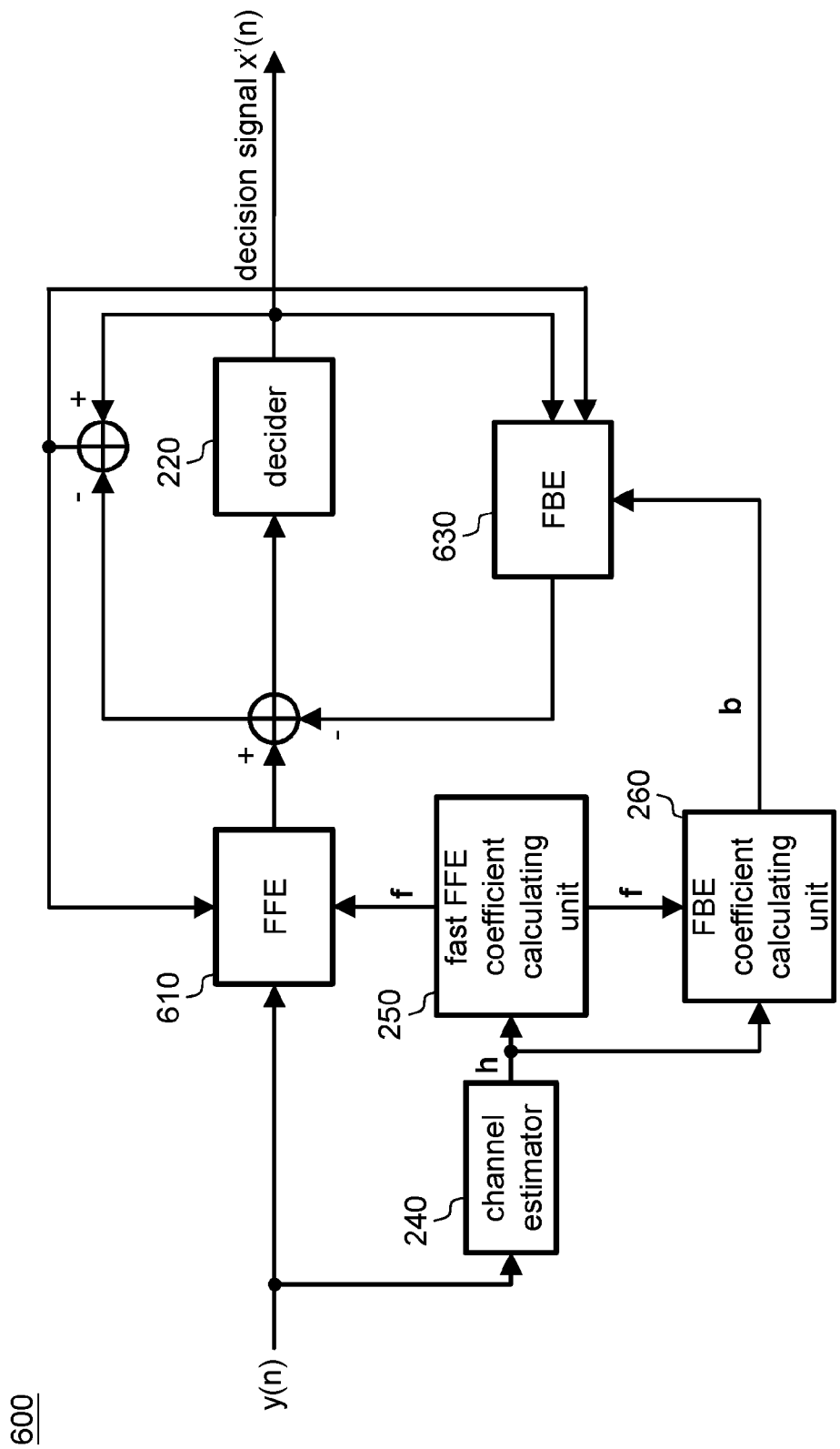
FIG. 13 is a functional block diagram of a DFE according to another embodiment of the present invention.

Further, the present invention is capable of achieving preferred effects by appropriately fine-tuning the FFE coefficient f and the FBE coefficient b. FIG. 13 shows a functional block diagram of a DFE according to another embodiment of the present invention. In addition to having functions of the FFE 210 and the FBE 230, an FFE 610 and an FBE 630 of the DFE 600 are capable of fine-tuning respective equalizer coefficients according to an input (associated with a feed-forward equalization filtered result of the FFE 610 and a feed-backward equalization filtered result of the FBE 630) and an output of the decider 220. The FFE 610 and the FBE 630 of the DFE 600 may fine-tune respective equalization coefficients by a conventional least mean square (LMS) algorithm, recursive least square (RLS) algorithm, or an algorithm equivalent or similar to the two algorithms above. Taking the LMS algorithm for instance, the FFE 610 and the FBE 630 may update or fine-tune respective equalization coefficients by adjusting the learning rate (or referred to as an update rate) of equations below:

$$f' = f + \mu_1 e^* r_f \quad (4)$$

$$b' = b + \mu_2 e^* r_b \quad (5)$$

In the above equations, f' and b' are respectively fine-tuned FFE coefficient and FBE coefficient, f and b are respectively FFE coefficient and FBE coefficient before fine-tuning, $\mu_1$ and $\mu_2$ are learning rates, e is an error value of the decider 220 between before and after the decision (i.e., the error value e is associated with the feed-forward equalization filtered result of the FFE 610, the feed-backward equalization filtered result of the FBE 630, and the decision signal inputted by the decider 220), and $\gamma_f$ and $\gamma_b$ are input signals of the equalizers. Corresponding to the foregoing fine-tuning mechanism, steps for fine-tuning the FFE coefficient f and the FBE coefficient b may be added after step S580 in the flowchart in FIG. 12. It should be noted that, the FFE 210 and the FFE 610 may be individually implemented by a fractionally-spaced feed-forward equalizer.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A decision feedback equalizer (DFE), comprising:
a channel estimator, generating a channel impulse response (CIR) estimation vector according to an input signal at a CIR estimation frequency;
a feed-forward equalizer (FFE) coefficient calculating unit, coupled to the channel estimator, generating an FFE coefficient according to the CIR estimation vector at a first frequency;
a feed-backward equalizer (FBE) coefficient calculating unit, coupled to the channel estimator and the FFE coefficient calculating unit, generating an FBE coefficient according to the CIR estimation vector and the FFE coefficient at a second frequency;
an FFE, coupled to the FFE coefficient calculating unit, generating a feed-forward equalization filtered result according to the input signal and the FFE coefficient;
an FBE, coupled to the FBE coefficient calculating unit, generating a feed-backward equalization filtered result according to a decision signal and the FBE coefficient; and
a decider, coupled to the FFE and the FBE, generating an updated decision signal according to the feed-forward equalization filtered result and the feed-backward equalization filtered result;
wherein, at least one of the first frequency and the second frequency is smaller than the CIR estimation frequency,
wherein the first frequency is smaller than the second frequency.

2. The DFE according to claim 1, wherein the FFE and the FBE synchronously update respective filtering coefficients by the feed-forward equalization filtered result and the feed-backward equalization filtered result respectively, and the feed-forward equalization filtered result and the feed-backward equalization filtered result are generated according to different CIR estimation vectors.

3. The DFE according to claim 1, wherein the second frequency is smaller than the CIR estimation frequency.

4. The DFE according to claim 1, wherein the channel estimator compares the CIR estimation vector with a previous CIR estimation vector to generate a comparison result, and outputs a control signal according to the comparison result to at least one of the FFE coefficient calculating unit and the FBE coefficient calculating unit to determine the first frequency and the second frequency.

5. The DFE according to claim 1, wherein the FFE coefficient calculating unit and the FBE coefficient calculating unit compare the CIR estimation vector with a previous CIR estimation vector to generate respective comparison results, and respectively generate the first frequency and the second frequency according to the respective comparison results.

6. The DFE according to claim 1, wherein the FFE adjusts the feed-forward coefficient according to the feed-forward equalization filtered result, the feed-backward equalization result and the decision signal based on an algorithm; the FBE adjusts the FBE coefficient according to the feed-forward equalization filtered result, the feed-backward equalization result and the decision signal based on the algorithm.

7. The DFE according to claim 6, wherein the algorithm is one of a least mean square (LMS) algorithm and a recursive least square (RLS) algorithm.

8. A control method for a decision feedback equalizer (DFE), comprising:
generating a channel impulse response (CIR) estimation vector according to an input signal at a CIR estimation frequency;
generating an FFE coefficient according to the CIR estimation vector at a first frequency;
generating an FBE coefficient according to the CIR estimation vector and the FFE coefficient at a second frequency;
generating a feed-forward equalization filtered result according to the input signal and the FFE coefficient;
generating a feed-backward equalization filtered result according to a decision signal and the FBE coefficient; and
generating an updated decision signal according to the feed-forward equalization filtered result and the feed-backward equalization filtered result;
wherein, at least one of the first frequency and the second frequency is smaller than the CIR estimation frequency,
wherein the first frequency is smaller than the second frequency.

9. The control method according to claim 8, further comprising:
synchronously updating filtering coefficients of the FFE and the FBE by the feed-forward equalization filtered result and the feed-backward equalization filtered result respectively, wherein the feed-forward equalization filtered result and the feed-backward equalization filtered result are generated according to different CIR estimation vectors.

10. The control method according to claim 9, wherein the second frequency is smaller than the CIR estimation frequency.

11. The control method according to claim 8, further comprising:
comparing the CIR estimation vector with a previous CIR estimation vector to generate a comparison result; and
determining the first frequency and the second frequency according to the comparison result.

12. The control method according to claim 8, further comprising:
adjusting the feed-forward coefficient according to the feed-forward equalization filtered result, the feed-backward equalization result and the decision signal based on an algorithm; and
adjusting the FBE coefficient according to the feed-forward equalization filtered result, the feed-backward equalization result and the decision signal based on the algorithm.

13. The control method according to claim 12, wherein the algorithm is one of a least mean square (LMS) algorithm and a recursive least square (RLS) algorithm.

* * * * *